United States Patent
Ohnishi

(10) Patent No.: US 7,321,596 B2
(45) Date of Patent: Jan. 22, 2008

(54) PACKET CONTROL SYSTEM AND COMMUNICATION METHOD

(75) Inventor: Hiroya Ohnishi, Chiba (JP)

(73) Assignee: Fujikura Ltd., Tokyo (JP)

( * ) Notice: Subject to any disclaimer, the term of this patent is extended or adjusted under 35 U.S.C. 154(b) by 1048 days.

(21) Appl. No.: 10/201,021

(22) Filed: Jul. 24, 2002

(65) Prior Publication Data
US 2003/0039254 A1    Feb. 27, 2003

(30) Foreign Application Priority Data
Aug. 27, 2001  (JP) .............................. 2001-255671

(51) Int. Cl.
*H04J 3/26* (2006.01)

(52) U.S. Cl. ....................... 370/429; 370/462
(58) Field of Classification Search ................ 370/412, 370/429, 462
See application file for complete search history.

(56) References Cited
U.S. PATENT DOCUMENTS
5,557,608 A * 9/1996 Calvignac et al. .......... 370/389
6,856,628 B1 * 2/2005 Bychowsky et al. ........ 370/412

FOREIGN PATENT DOCUMENTS
| JP | 61-20454 | 1/1986 |
| JP | 1-165245 | 6/1989 |
| WO | WO 200020876 A1 * | 4/2000 |

* cited by examiner

*Primary Examiner*—Melvin Marcelo
(74) *Attorney, Agent, or Firm*—Oblon, Spivak, McClelland, Maier & Neustadt, P.C.

(57) ABSTRACT

Provided is a packet communication apparatus capable of instantly transmitting information requiring urgency without lowering data transfer efficiency even during a communication. The packet communication apparatus comprises first and second packetization sections 8 and 9 for converting signals transmitted from signal processing sections 2 and 7 to packets of predetermined forms, priority packet interleaving means 10 for interleaving the packet from the second packetization section 9 in the packet from the first packetization section 8 even during a transmission of the packet from the first packetization section 8 when the packet from the second packetization section 9 is input thereto, and a transmitter 3 for transmitting the packet output from the priority packet interleaving means 10 to a packet transmission communication medium 4.

6 Claims, 5 Drawing Sheets

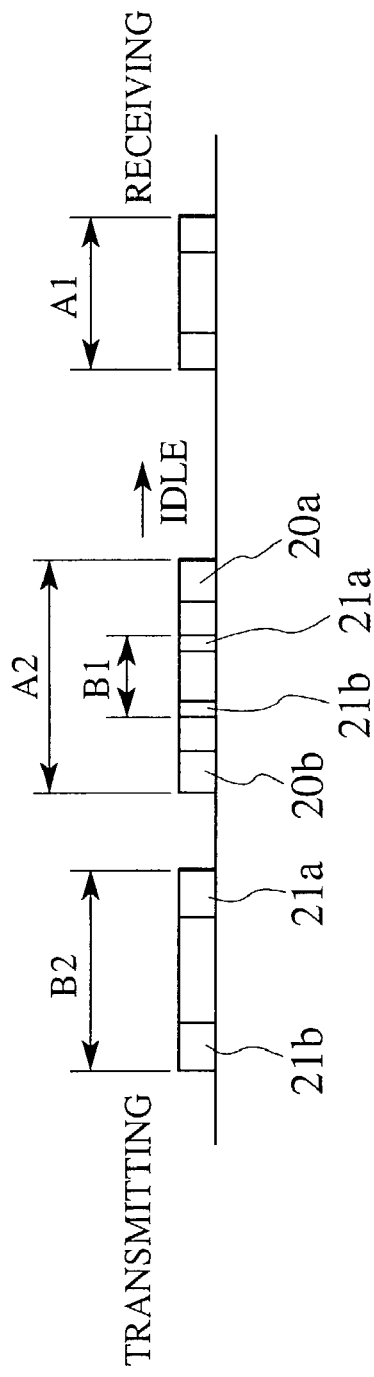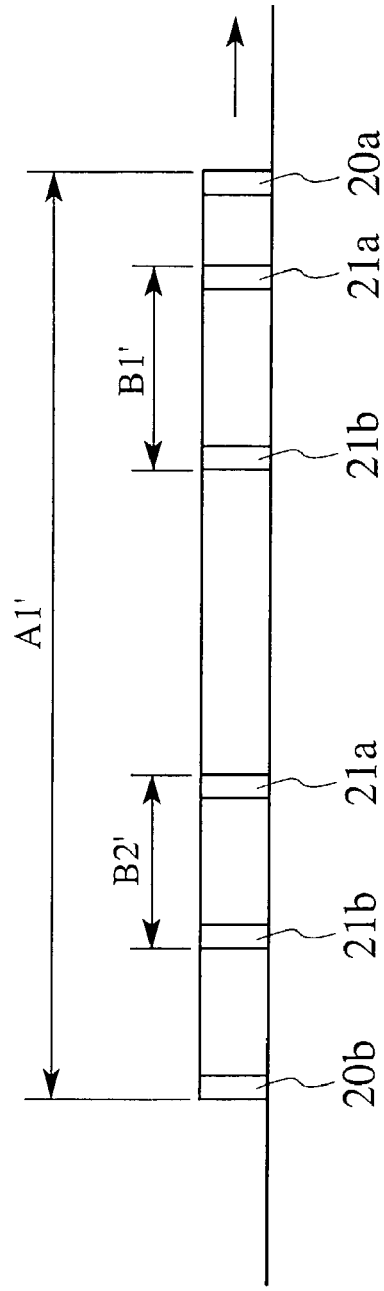

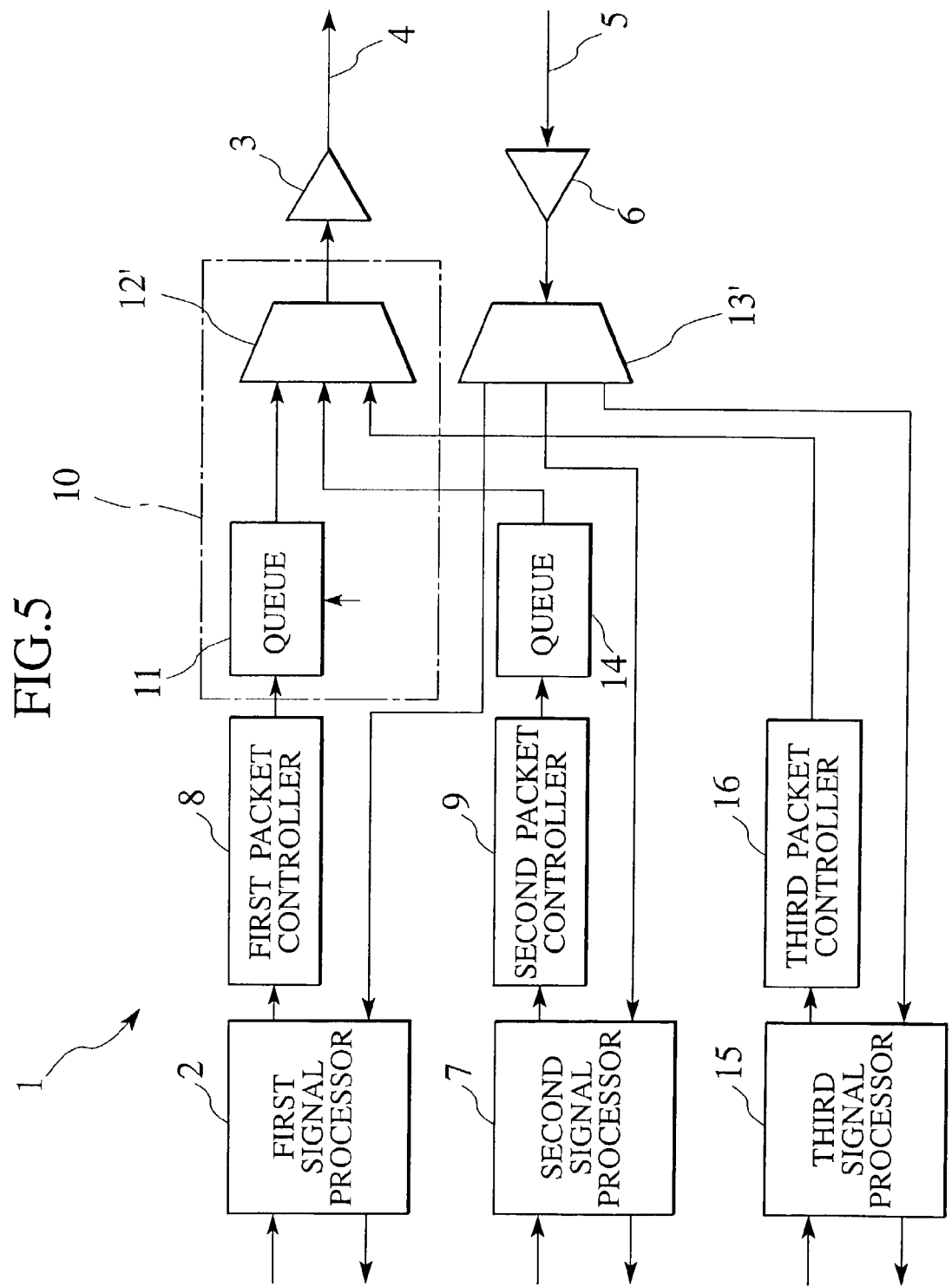

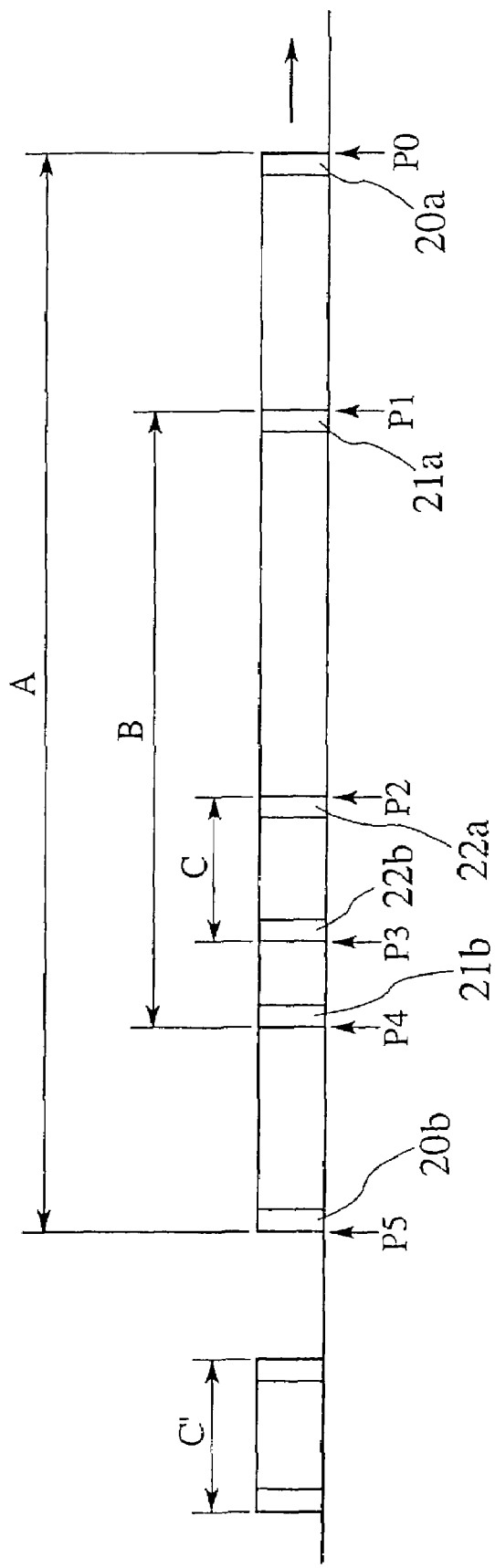

PACKET CONTROL SYSTEM AND COMMUNICATION METHOD

BACKGROUND OF THE INVENTION

1. Field of the Invention

The present invention relates to a packet control system, which divides pieces of information into predetermined bit strings and transmits them, and more particularly to a packet control system which interleaves a packet, which includes information requiring urgency, between other packets.

2. Description of the Related Art

In well known packet communications, information transmitted between a transmission side and a receiving side has been heretofore stored in a data string of a finite length as shown in FIG. 1, which is called a packet. To realize this packet communication in physical layer, conditions must be defined so that a packet transmitted from the transmission side can be read correctly by the receiving side. The most elementary conditions are to define a correspondence between electrical, magnetic and optical waveforms being transmitted through a communication medium and a bit (generally, 0 or 1) that is a unit of information. However, such conditions are not satisfactory enough to establish the packet communication.

Specifically, the following items must be decided.

a) a method for displaying a header and tail of a packet and for reading these headers and tails b) correspondence between positions of bits (1, 0) existing in the packet and transmission information (so called a packet format).

As the foregoing conditions for displaying the header of the packet, there are the following methods.

1) a method for defining a specific bit string that can be uniquely distinguished 2) a method for deciding as a starting point of the packet a time point when a specific bit string first appears after a later-described idle.

Furthermore, as an condition for displaying the tail of the packet, there are the following methods.

3) a method of defining a specific bit string that can be uniquely distinguished.

4) a method for displaying a length of a packet in a packet format.

5) a method for defining a bit string before an idle as a packet body. Note that a specific bit string displaying a header of a packet shall be called "a start-of-packet delimiter" and a specific bit string displaying a tail of the packet shall be called "an end-of-packet delimiter".

The information to be transmitted in the packet communication does not continue to be generated temporally, but an idle state where no information exists is present in the packet communication. As a condition for distinguishing this idle state, there are the following methods.

6) a method for defining a specific bit string that can be uniquely distinguished.

7) a method for creating a non-signal state (state where no electrical, magnetic and optical waveforms are present).

When the conventional packet communication is illustrated schematically based on the above descriptions, the conventional packet communication is shown in FIG. 2. In FIG. 2, a start-of-packet delimiter is added to the header of a packet, and an end-of-packet delimiter is added to the rear portion thereof.

SUMMARY OF THE INVENTION

By the way, in the packet communication adopting the conventional methods, after the transmission of a packet has been once begun, it is impossible to transmit a next packet until the transmission of this packet is completed. Furthermore, when a large capacity of data is transmitted, a packet length is made long to improve a data transfer efficiency and then the data is transferred.

For this reason, when information that must be transmitted at a previously defined timing exists, or when specified information must be transmitted promptly because of occurrence of emergency, it is obliged to wait the transmission of a next packet until the transmission of another packet is completed after it is begun.

The present invention was made to solve the foregoing subjects, and an end of the present invention is to provide a packet communication apparatus capable of instantly transmitting information requiring urgency without decreasing a data transfer efficiency even during communication.

According to a first technical aspect of the present invention, a packet communication control apparatus which transmits packets, in which a data string of a predetermined length is stored, to a terminal through a communication line, and takes in a signal from other terminals when the signal is received, the packet communication control apparatus comprising priority packet interleaving means which, when the packet is transmitted to the outside thereof, packetizes a signal requiring urgency upon receipt of this signal, and interleaves the signal between the packets.

According to a second technical aspect of the present invention, the priority packet interleaving means comprises means for generating an interleaving packet in which a second start-of-packet delimiter is attached to a header of the signal and an interleaving end-of-packet delimiter is attached to a tail thereof, when the signal is input, a multiplexer section having means for transmitting the packet to be transmitted after allowing the packet to stay in a queue to stop a transmission of the packet and transmitting the interleaving packet, when the interleaving packet is generated, and the queue for receiving the packet, holding the packet once in response to an instruction to stay the packet therein, which is issued from the multiplexer, and sending out the held packet to the multiplexer accompanied with an instruction to send out the held packet, which is issued from the multiplexer.

Specifically, in the packet communication apparatus which transmits the packet, in which the data string of a predetermined length is stored, to other apparatuses via communication lines and takes in a signal when the signal is received from other apparatuses, provided is priority packet interleaving means for packetizing a signal having a high priority (priority signal) to a priority packet and for interleaving the priority packet in a packet generated from a signal having a low priority (low priority packet) when the priority signal exists even during a transmission of the low priority packet to the outside. The multiplexer is provided, which identifies the priority packet when the priority packet is interleft in the received low priority packet.

According to a third technical aspect of the present invention, a communication method of a communication apparatus transmitting/receiving data strings to/from other communication apparatuses via communication lines, the method allowing each data string to relates to at least two priority levels and comprising the steps of (i) allowing a first data string to relate to a first priority level, and (ii) allowing a second data string to relate to a second priority level, and (iii) sequentially outputting the first and second data strings while identifying the first and second data strings, when the data string of the second priority level is input during outputting of the data string of the first priority level, outputting of the data string of the first priority level is interrupted and the data string of the first priority level is temporarily stored, the data string of the second priority level is preferentially output, and the outputting of the stored data string of the first priority level is resumed.

BRIEF DESCRIPTION OF THE DRAWINGS

FIGS. 4A and 4B are each conceptual view of a packet signal in which a priority packet signal is interleaved.

FIG. 5 illustrates an embodiment when a packet having many priority orders is transmitted/received.

FIG. 6 is a conceptual view of a packet signal of the embodiment of FIG. 5.

DESCRIPTION OF THE PREFERRED EMBODIMENT

First Embodiment

Figure 3:
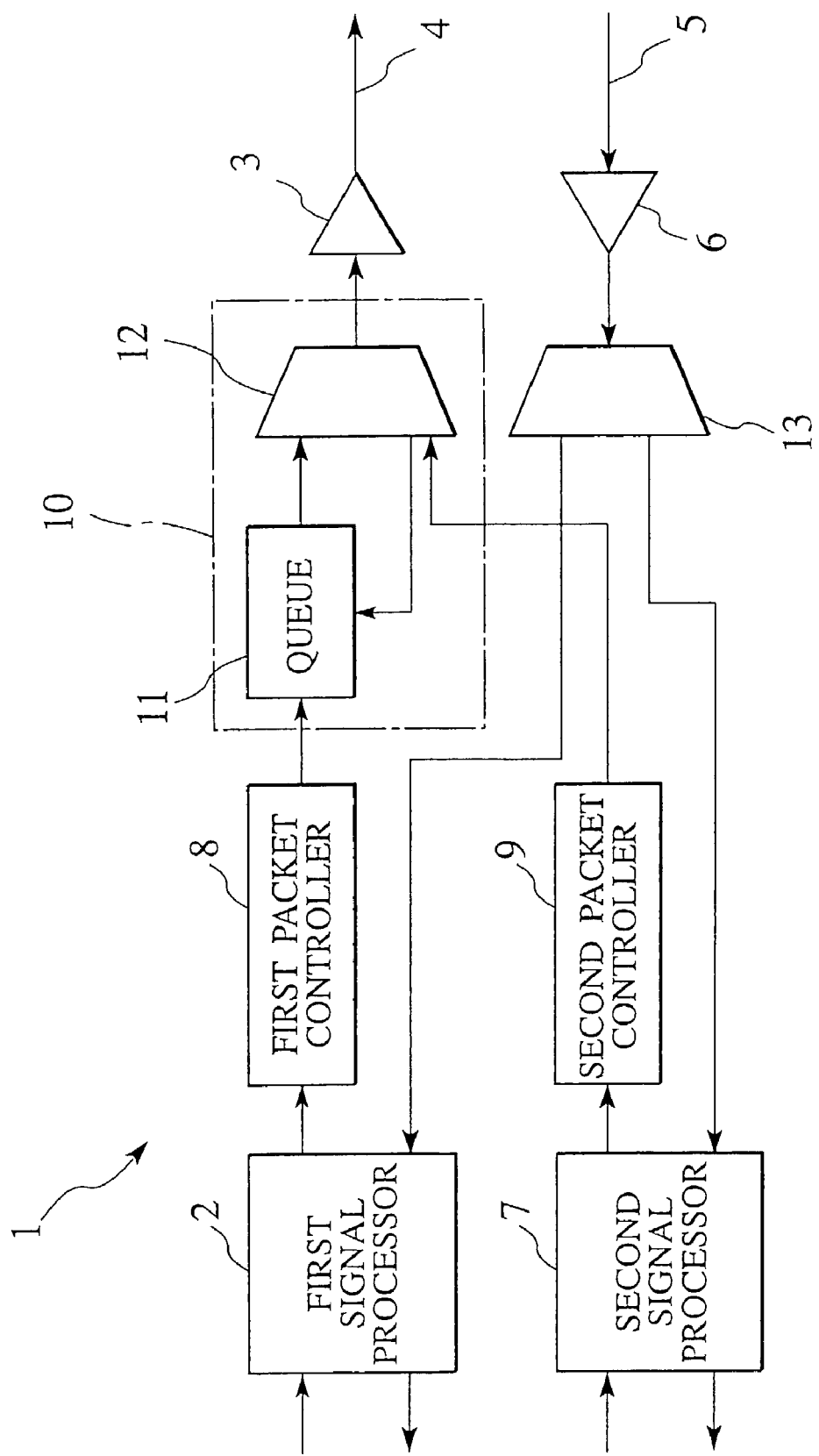
FIG. 3 is a block diagram illustrating a schematic constitution of a packet control system according to an embodiment of the present invention.

FIG. 3 is a block diagram showing a schematic constitution of a packet communication control apparatus according to an embodiment of the present invention. The packet communication apparatus should be provided in a communication apparatus of a communication system in which a general data (low priority), data such as voice and a pictorial image, which must be transmitted isochronously, and data (high priority) for an urgent control exist collectively.

A packet communication control apparatus 1 in FIG. 3 comprises first and second signal processors 2 and 7 which exchange signals with other apparatuses or with other functional sections (not shown) in the packet control system 1; first and second packetization sections 8 and 9 which convert the signals transmitted from the first and second signal processors 2 and 7, respectively, to packets having a predetermined form; priority packet interleaving means 10 which interleaves a packet (hereinafter referred to as a priority packet) from the second packetization sections 9 when the priority packet is input thereto even if a packet (hereinafter referred to as an ordinary packet) from the first packetization section 8 is being transmitted; and a transmitter 3 for transmitting the packet output from the priority packet interleaving means 10 to a transmission communication medium 4.

Furthermore, the packet control system 1 comprises a receiver 6 for receiving a data string from a receiving communication medium 5; and a demultiplexer 13 provided at the rear stage of the receiver 6, which transmits the packets to the first and second signal processors 2 and 7 after taking out the ordinary packet and the priority packet from the received data string individually.

Packet Transmission Processing

An operation of the packet communication control apparatus constituted as described above will be described with reference to FIG. 4.

FIGS. 4A-4B are each conceptual view of the packet signal processing which is executed when the priority packet is interleaved between the ordinary packets. If a signal to be transmitted to the first signal processing section 2 exists, the first signal processing section 2 transmits the signal to the first packetization section 8. The first packetization section 8 which has received the signal processes this signal to convert a packet.

In order to generate the packet as described above, though the processing is executed in accordance with various conditions, only attachments of a first start-of-packet delimiter and a first end-of-packet delimiter, which are specific bit strings uniquely distinguished, to the header and tail of the packet are required for the packetization of the signal by the first packetization section 8. As in the data string A1 of FIG. 4A, the packet generated by the first packetization section 8 has the first start-of-packet delimiter at its header as a packet identifier, and has the first end-of-packet delimiter at its tail.

As to what bit string is used for the first start-of-packet delimiter and the first end-of-packet delimiter (a second start-of-packet delimiter and a second end-of-packet delimiter to be described later), there is no limitation as long as they can be distinguished uniquely.

The packet generated by the first packetization section 8 is input to a queue 11 in the priority packet interleaving means 10. The queue 11 is a functional section having a concept of a first-in first-out (FIFO) type memory. When no priority packet to be transmitted exists (hereinafter referred to as a normal time), a data string constituting the packet input from the first packetization section 8 is transferred in its order to a multiplexer 12 as a selector. When the transmission of a priority packet to be described later is performed, the queue 11 stops its outputting operation temporarily, and allows an ordinary packet, which is input from the first packetization section 8, to stay there.

When the transmission timings of the ordinary and priority packets do not overlap, the data strings of these packets are transmitted as they are. Specifically, when the data string A1 of FIG. 4A is transmitted, the multiplexer 12 directly transmits the ordinary packet, which is transmitted from the first signal processing section 2 through the queue 11, to the transmitter 3.

On the other hand, if a signal to be transmitted to the first signal processing section 7 exists, the first signal processing section 7 transmits the signal to the second packetization section 9. The second packetization section 9, which received the signal, processes this signal to convert it to a packet. When a data string B2 of FIG. 4A is transmitted, the multiplexer 12 transfers the priority packet, which is transmitted from the first signal processing section 7 through the second packetization section 9, to the transmitter 3 as it is.

This embodiment of the present invention requires the packetization of the second packetization section 9 to only attach the second start-of-packet delimiter and the second end-of-packet delimiter to the header and end of the packet, the second start-of-packet and end-of-packet delimiters being respectively distinguishable uniquely. The packet generated by the second packetization section 9 has a second start-of-packet delimiter at its header and a second end-of-packet delimiter at its tail as a packet identifier, which is shown as B1 in FIG. 4A.

The packet generated by the second packetization section 9 is input to the multiplexer 12 in the priority packet interleaving means 10.

When the multiplexer 12 receives the priority packet B1 from the second packetization section 9, the multiplexer 12 transfers the priority packet B1 to the transmitter 3 irrespective of the presence of inputting of the ordinary packet from the queue 11. At this time, if the ordinary packet A2 is input from the queue 11 to the multiplexer 12, the multiplexer 12 instructs the queue 11 to stop outputting the packet temporarily, and allows the packet to stay in the queue 11. At the time when the transmission of the packet input from the second packetization section 9 is completed, the multiplexer 12 resumes the transfer of the ordinary packet, which is staying in the queue 11, to the transmitter 3.

In other words, in such a case, the data string transmitted from the transmitter 3 to the transmission communication medium 4 adopts the form in which the packet B1 interleaves in the packet A2 as shown by A2 and B1 of FIG. 4A. FIG. 4B shows a case of an ordinary packet A1' interleaved with plurality of priority packets B1', B2' in the same manner. When the ordinary packet alone is input from the queue 11 to the multiplexer 12, the multiplexer 12 transfers the ordinary packet to the transmitter 3 directly.

Packet Receiving Processing

The data string which the packet control system 1 receives from the receiving communication medium 5 has a priority packet interleft in the ordinary packet as shown in FIGS. 4A-4B. The data string which the receiver 6 received from the receiving communication medium 5 is transmitted to the demultiplexer 13 as a distributor.

The demultiplexer 13 monitors the first start-of-packet delimiter, the first end-of-packet delimiter, the second start-of-packet delimiter and the second end-of-packet delimiter, which are packet identifiers included in the received data strings.

For example, when the demultiplexer 13 receives the data string A1 including only the ordinary packet, the demultiplexer 13 detects the first start-of-packet delimiter in the data string received, and then transfers the data string to the first signal processing section 8 until the first end-of-packet delimiter is detected. Accordingly, this data string constitutes the ordinary packet.

When the demultiplexer 13 receives the data string B2 including only the priority packet, the demuliplexer 13 detects the second start-of-packet delimiter in the data string received, and transfers the data string to the second signal processing section 7 until the second end-of-packet delimiter is detected.

If the demultiplexer 13 detects the second start-of-packet delimiter in the data string received, the demultiplexer 13 transfers the data string to the second signal processing section 7 until the second end-of-packet delimiter is detected.

If the demultiplexer 13 detects the first start-of-packet delimiter in the data string received, the demultiplexer 13 transfers the data string, in which the one from the second start-of-packet delimiter to the second end-of-packet delimiter is excluded from the one until the first end-of-packet delimiter is detected is excluded, to the first signal processing section 2. This data string constitutes the ordinary packet.

As described above, when the data having a high priority is transmitted, the second start-of-packet delimiter is attached to the header and the second end-of-packet delimiter is attached to the tail in this embodiment, and this data having the high priority is interleaved in the data string of the ordinary packet as the priority packet. Accordingly, for example, even the long ordinary packet for transferring a large capacity of data is being transmitted, a packet to be prioritized can be transmitted without waiting the finish of the transmission of the ordinary packet.

Second Embodiment

Figure 1:
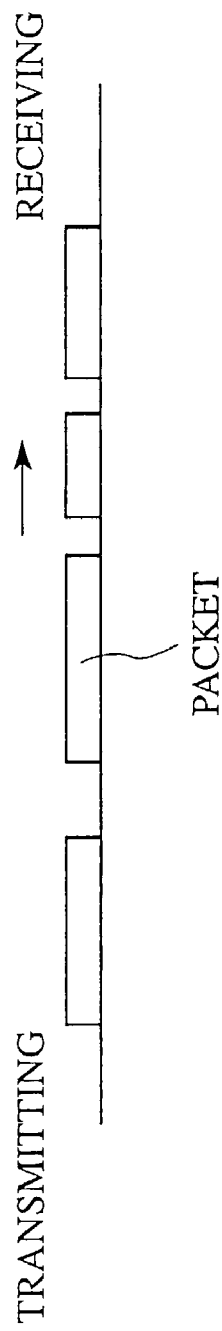
FIG. 1 is a conceptual view of a packet communication.
Figure 2:
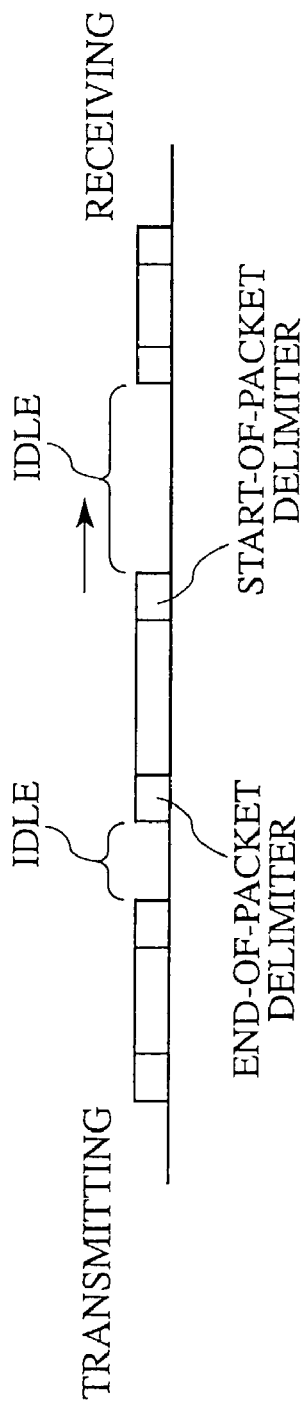
FIG. 2 is a schematic view of a packet signal in a conventional packet communication.

FIG. 2 shows a case where a packet having many priority orders is transmitted/received, and shows an embodiment in which the first embodiment is generalized. The function of each block has been already described. FIG. 5 is a case where the packets have plurality of levels concerning the priority order, and the embodiment in which the number of the level L is three. Specifically, as shown in FIG. 6, the packet of a first priority order (L=3) is expressed by the data string C or C', the packet of a second priority order (L=2) is expressed by the data string B, and the packet of a third priority order (L=1) is expressed by the data string A. The data string C of the packet generated by a third packetization section 16 has a third start-of-packet delimiter 22a in its header as a packet identifier, and has a third end-of-packet delimiter 22b in its tail. The data string C is processed prior to the data strings A and B.

When there is no overlap in the data strings of the packets to be input to the multiplexer 12, each of the data strings is transmitted according to the order of inputting of them to the multiplexer 12. When two data strings having different levels overlap, these data strings are processed in the same manner as the first embodiment.

Descriptions for a case where three data strings having different levels overlap will be made based on FIG. 6. When the data string A constituting the packet of the third priority order (L=1) is being output, a first overlapping state occurs by the presence of the data string B constituting the packet of the second priority order (L=2) either in the second signal processing section 7 or in the queue 14. At this time, the data string B is transmitted from the multiplexer 12 prior to the data string A in the same manner as the first embodiment (P1). At this time, a second overlapping state occurs by the presence of the data string C constituting the packet of the first priority order (L=3) in the third signal processing section 15. In this case, though output of the data string A has been already stayed in the queue 11, the output of the data string B stays in the queue 14, and the data string C is transmitted preferentially (P3).

Then, when the third end-of-packet delimiter 22b is output and the transmission of the data string C is completed (P3), the output of the data string B that has been stayed in the queue 14 is resumed, and the transmission of the data string B is completed by the output of the second end-of-packet delimiter 21b (P4). Thereafter, the output of the data string A that has been stayed in the queue 11 is resumed, and the outputs of all data strings are completed by the output of the first end-of-packet delimiter 20b (P5).

As shown in FIG. 6, the demultiplexer 13' monitors a first start-of-packet delimiter 20a, a first end-of-packet delimiter 20b, a second start-of-packet delimiter 21a, a second end-of-packet delimiter 21b, a third start-of-packet delimiter 22a and a third end-of-packet delimiter 22b, which are packet identifier included in the data strings received.

When the demultiplexer 13' detects the third start-of-packet delimiter 22a in the data string received, the demultiplexer 13' transmits the data string to the third signal processing section 15 until the third end-of-packet delimiter 22b is then detected. This data string C constitutes the first priority order packet received.

When the demultiplexer 13' detects the second start-of-packet delimiter 21a in the received data string, the demultiplexer 13' transmits the data string to the second signal processing section 7, in which the packet data string having a higher priority order (L>2), for example, the data string C, is excluded among the data strings until the second end-ofpacket delimiter 21b is then detected. This data string constitutes the second priority order packet received.

When the demultiplexer 13' detects the first start-of-packet delimiter in the received data string, the demultiplexer 13' transmits the data string to the first signal processing section 2, in which the packet data string having a higher priority order (L>1), for example, the data string B or C, is excluded among the data strings until the first end-of-packet delimiter 20b is then detected. This data string constitutes the third priority order packet received.

As described above, in this embodiment, the start-of-packet delimiter and end-of-packet delimiter which correspond to the priority order of each data strings are attached thereto, and the data string is interleft in the data string having a lower priority order. Even when a long packet for transferring a large capacity of data is being transmitted, it is possible to transmit a packet to be prioritized without waiting the completion of the transmission of this long packet. As is apparent for a person having ordinary skill in the art by the above descriptions, the number of the levels of the priority order is not limited to three, but the present invention can be applied to a case where the number of the levels of the priority order is more than three.

Effects of the Invention

According to the present invention, when a signal requiring urgency is inputted, the signal is packetized, and the packetized signal is interleaved in a packet to be transmitted. Therefore, the present invention can afford the effect that the packet to be prioritized can be interleaved in the packet having large capacity without waiting the completion of the transmission of the packet even when the packet is being transmitted.

According to the present invention, when an input signal has a high transmission priority, this signal is packetized to generate an interleaving packet as a packet unit in such a manner that a second start-of-packet delimiter is attached to its header and a second end-of-packet delimiter is attached to its tail. The interleaving packet is interleaved in a packet to be transmitted. Therefore, even when along packet for transferring a large capacity of data is being transmitted, the interleaving packet can be transmitted without waiting the completion of the transmission of the long packet. In addition, it is possible to transmit a signal requiring urgency without lowering data transmission efficiency by splitting a large capacity of data to a short packet.

Furthermore, according to the present invention, the start-of-packet and end-of-packet delimiters of the packet, in which the data string is stored, and the interleaving start-of-packet and end-of-packet delimiters of the control signal can be different from each other in their code expressions. Accordingly, it is possible to fetch out the packet requiring urgency correctly.

What is claimed is:

1. A packet communication control apparatus which transmits a packet, in which a data string of a predetermined length is stored, to a terminal via a communication line, and takes in a signal when the signal is received from other terminals, the apparatus comprising:

a priority packet interleaving circuit which packetizes a signal requiring a more urgent transmission than that of said packet and interleaves the packetized signal in said packet as said packet is transmitted to the outside and said signal is input thereto, wherein said packet has a single start-of-packet delimiter and a single end-of-packet delimiter.

2. The packet communication control apparatus according to claim 1, wherein said priority packet interleaving circuit comprises:

an interleaving packet generator for generating an interleaving packet in which a second start-of-packet delimiter is attached to a header of said signal and a second end-of-packet delimiter is attached to a tail thereof as said signal is inputted;

a multiplexer section having means for transmitting said packet to be transmitted after allowing said packet to stay in a queue to stop a transmission of said packet and transmitting said interleaving packet as said interleaving packet is generated; and said queue for receiving said packet, holding said packet once in response to an instruction to stay said packet therein issued from said multiplexer, and sending out said held packet to said multiplexer accompanied with an instruction to send out said held packet issued from said multiplexer.

3. The packet communication control apparatus according to claim 2, wherein start-of-packet and end-of-packet delimiters of said packet in which said data string is stored are different in their code expressions from interleaving start-of-packet and end-of-packet delimiters of said signal requiring a more urgent transmission than that of said packet.

4. A communication apparatus which transmits/receives data string to/from other communication apparatuses via communication lines, each data string being related to at least two priority levels, the communication apparatus comprising:

a first processing section for processing a first data string, said first processing section allowing said first data string to be related to a first priority level and having a first memory for storing said first data string temporarily according to demand, wherein said first data string has a single start-of-string delimiter and a single end-of-string delimiter;

a second processing section for processing a second data string, said second processing section allowing said second data string to be related to a second priority level; and a selector for receiving the data strings output from said first and second processing sections and for outputting the data strings selectively depending on the priority levels, said selector identifying the priority levels of the data strings, wherein as the data string of the second priority level is inputted during outputting of the data string of the first priority level, outputting of the data string of the first priority level is interrupted and the data string of the first priority level is stored in said first memory, the data string of the second priority level is preferentially outputted, the outputting of the data string of the first priority level stored in said first memory is resumed, each of said data strings constitutes a packet, and each of said data strings has a start-of-packet delimiter and an end-of-packet delimiter which are related to the priority level corresponding to each of said data strings.

5. The communication apparatus according to claim 4, the communication apparatus further comprising:

a distributor for outputting the received data string either to said first processing section or to said second processing section in accordance with the priority level of the data string.

6. A communication method of a communication apparatus which transmits/receives a data string to/from other communication apparatuses via communication lines, comprising the steps of:

allowing a first data string to relate to a first priority level, wherein said first data string has a single start-of-string delimiter and a single end-of-string delimiter;

allowing a second data string to relate to a second priority level;

sequentially outputting said first and second data strings while identifying said first and second data strings;

as the data string of the second priority level is inputted during outputting of the data string of the first priority level, interrupting outputting of the data string of the first priority level and storing the data string of the first priority level temporarily;

outputting the data string of the second priority level preferentially; and resuming the outputting of the stored data string of the first priority level, wherein a processing for allowing the first data string to relate to the first priority level is performed by attaching a start-of-packet delimiter and an end-of-packet delimiter to said first data string, the start-of-packet and end-of-packet delimiters being related to said priority level; and a processing for allowing the second data string to relate to the second priority level is performed by attaching a start-of-packet delimiter and an end-of-packet delimiter to said second data string, the start-of-end and end-of-packet delimiters being related to said priority level.

* * * * *